United States Patent [19]

Kunii et al.

[11] Patent Number: 4,553,016

[45] Date of Patent: Nov. 12, 1985

[54] ELONGATED NON-METALLIC SHEET HAVING A METAL EMBEDDED THEREIN OR ATTACHED THEREON

[75] Inventors: Hiroyuki Kunii; Hirohisa Sente; Kouji Hironaka, all of Icihara, Japan

[73] Assignee: UBE Industries, Ltd., Yamaguchi, Japan

[21] Appl. No.: 386,616

[22] Filed: Jun. 9, 1982

[51] Int. Cl.$^4$ ............................................. B23K 27/00
[52] U.S. Cl. ................... 219/121 LG; 83/370; 83/364; 219/121 LN; 219/121 PC; 219/121 LU; 219/121 LX
[58] Field of Search ............... 219/121 LG, 121 LN, 219/121 LS, 121 LU, 121 LY, 121 LX, 121 EH, 121 PC, 121 PH; 83/177, 370, 371, 364, 365

[56] References Cited

U.S. PATENT DOCUMENTS

| | | | |
|---|---|---|---|
| 3,290,167 | 12/1966 | Wood et al. | |
| 3,719,114 | 3/1973 | Vischulis | 83/368 |
| 3,753,381 | 8/1973 | Reime et al. | 83/364 |
| 3,932,726 | 1/1976 | Verheyen et al. | 219/121 LS X |
| 3,948,125 | 4/1976 | Hujer et al. | 83/364 X |
| 4,070,939 | 1/1978 | Neumeister | 83/368 |
| 4,266,112 | 5/1981 | Niedermeyer | 219/121 LN |
| 4,323,757 | 4/1982 | Oka et al. | 219/121 LG X |
| 4,404,634 | 9/1983 | Bautz | 83/365 X |

FOREIGN PATENT DOCUMENTS 681000 10/1952 United Kingdom ............... 164/39

*Primary Examiner*—C. L. Albritton
*Attorney, Agent, or Firm*—Finnegan, Henderson, Farabow, Garrett & Dunner

[57] ABSTRACT

There are provided an improved product consisting of an elongated non-metallic sheet having a metal embedded therein or attached thereon over the entire length thereof and method and apparatus for producing the same. In particular, the product having the metal forming a wire arranged in a zigzag fashion may preferably used for covering and protecting joints of steel pipes in oil pipeline or cables. In the improved product, the sheet is trimmed on each of the longitudinal sides along a line a predetermined lateral distance outwardly or inwardly from the outline of the periphery of the corresponding side of the metal. In a case of the wire in a zigzag fashion, the wire has turning ends and the outline connects neighboring turning ends.

3 Claims, 5 Drawing Figures

ELONGATED NON-METALLIC SHEET HAVING A METAL EMBEDDED THEREIN OR ATTACHED THEREON

BACKGROUND OF THE INVENTION (1.) Field of the Invention

The present invention relates to an improved product consisting of an elongated non-metallic sheet having a metal embedded in intimate contact there with over the entire length thereof and to a method and apparatus for producing the same. In particular, the present invention relates to a laminated sheet comprising a pair of heat-shrinkable layers fused together with a heating element, such as an electric conductor wire to which electricity is applied, therebetween.

(2.) Description of the Prior Art

A laminated heat-shrinkable sheet with wire embedded therein is well-known as a means for covering and protecting joints of steel pipes in oil pipelines or cables. The sheet is formed by fusing two heat-shrinkable layers of, for example, polyethylene, placed one on top of the other with a wire of, for example, copper therebetween. The layers have the property of being thermally shrinkable in the lengthwise direction. The wire should not be aligned parallel to the shrinking direction but traversely thereto at approximately a right angle and thus has preferably been arranged in a zigzag manner as shown in FIG. 1, in which the numerals 1 and 2 denote the sheet and the wire, respectively. The finished sheet used as a sealing means has a predetermined length and a pair of electric terminals to be connected to a power source. The terminals are on the two ends of the wire exposed from the sheet at the opposite ends of the sheet. The heat-shrinkable sheet is wound around a steel pipe or cable so as to cover the joint portion entirely. Electricity is then applied through the terminals of the wire embedded in the sheet to heat the wire. The arranged hot wire heats the entire sheet to shrink it so that it is in extremely close contact with the joint portion. This close contact protects the joint from surface corrosion and improves sealing of the pipe at the joint. Such results are ensured for a long period even though they depend on the durability of the material forming the heat-shrinkable sheet.

Preferably, the sheet is formed of polyethylene and the wire is of copper.

However, difficulties arise in the manufacture of a polyethylene cover sheet. For example, when the copper wire is embedded in the sheet in a zigzag fashion as shown in FIG. 1, the peripheries of the longitudinal sides (or the rows of turning ends 2a) of the copper wire 2 do not always run parallel to the longitudinal axis of the sheet. As a result, when an electric current is flowed through the copper wire 2, the portion of the sheet 1 where the copper wire is not distributed properly with respect to the peripheries of the longitudinal sides of the sheet 1 is not heated enough to be shrunk. Therefore, when such defective polyethylene cover sheet is applied to a steel pipe joint, a gap is formed between the cover sheet and the joint, allowing water to permeate the joint therethrough causing degradation of the protective and anticorrosive characteristics of the sheet.

SUMMARY OF THE INVENTION

It is, therefore, a primary object of the present invention to provide an improved product in which the above-mentioned difficulties encountered in the manufacture of a sheet having an embedded wire are overcome.

A second object of the present invention is to provide a method of producing the above-mentioned improved product.

A third object of the present invention is to provide an apparatus for carrying out the above-mentioned method.

In accordance with the present invention, there is provided an improved product, that is an elongated non-metallic sheet having a metal embedded in intimate contact therewith over the entire length thereof, said sheet being trimmed on each of the longitudinal sides along a line a predetermined lateral distance from the outline of the periphery of the corresponding side of said metal.

In a case where said metal is a wire arranged in a zigzag fashion and having turning ends on each longitudinal side of said sheet the outline connects neighboring turning ends.

According to the present invention, there is provided a method of trimming an elongated nonmetallic sheet having a metal embedded in intimate contact therewith over the entire length thereof, comprising the steps of:

applying a cutting device for cutting the sheet, said cutting device being stationary in the longitudinal direction of the sheet;

transferring the sheet in the longitudinal direction along a predetermined straight transfer passage;

profiling the periphery of each of the longitudinal sides of the metal gradually while the sheet is in the process of being transferred and obtaining a first information signal indicative of a position a predetermined lateral distance outwardly or inwardly from the periphery profile or outline;

detecting the longitudinal moving distance of the sheet and obtaining a second information signal indicative of the moving distance of the sheet; and controlling the lateral movement of said cutting device in response to said first and second information signals so that the sheet is cut continuously on each of the longitudinal sides along a line parallel to and a predetermined distance outwardly or inwardly from the periphery of the outline of the corresponding side of the metal.

According to the present invention, there is provided an apparatus for trimming an elongated nonmetallic sheet having a metal embedded in intimate contact therewith, comprising:

a transfer device including an assembly of a plurality of tables of equal size and adapted so as to carry the sheet in the longitudinal direction along a moving passage of said transfer device;

a couple of penetrant-type sensors arranged midway in the moving passage of said transfer device, each of said sensors being capable of profiling the periphery of each of the longitudinal sides of the metal and of generating an information signal indicative of the position of the periphery;

a cutting device arranged adjacent to said sensors and being capable of moving in the lateral direction with respect to the metal and the sheet;

a detecting device adapted so as to detect the moving distance of said transfer device and being capable of generating an information signal indicative of the moving distance of said transfer device; and a signal-processing system including a first signal processor for said sensors, a pulse control section for said detecting device, and a first signal processor and a second signal processor for controlling the lateral movement of said cutting device with respect to the metal and the sheet;

whereby the sheet is cut automatically and continuously on each of the longitudinal sides thereof along a line a predetermined lateral distance outwardly or inwardly from the periphery of the corresponding side of the metal.

DESCRIPTION OF THE PREFERRED EMBODIMENTS

The preferred embodiments of the present invention will now be explained in detail by way of example with reference to the accompanying drawings.

Figure 1:
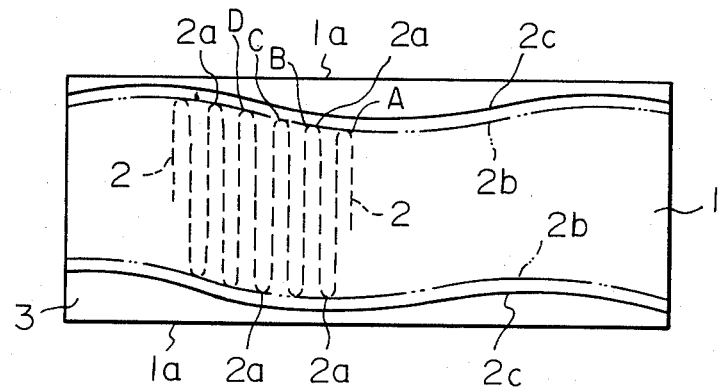
FIG. 1 is a plane view of one example of an elongated nonmetallic and metal-embedded sheet to be trimmed by the method of the present invention.
Figure 2:
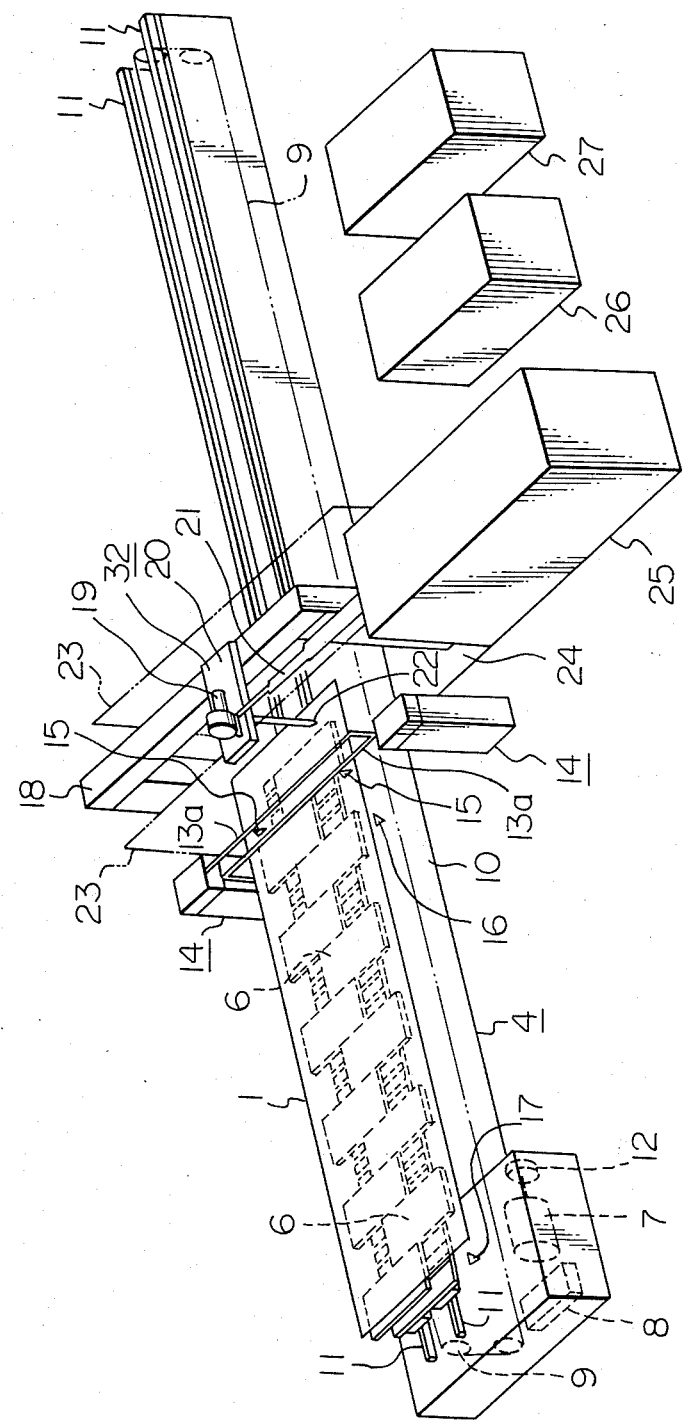
FIG. 2 is a perspective view of a preferred embodiment of an apparatus of the present invention for trimming the sheet shown in FIG. 1.

In FIG. 2, numeral 4 designates a transfer device provided with an assembly of tables 6 of equal size which is adapted so as to carry an elongated nonmetallic and metal-embedded sheet 1 in the longitudinal direction, the sheet being the same as that shown in FIG. 1. The table assembly is movable along guides 11 provided on a frame 10 through a mechanism including a variable speed motor 7, a reducing gear, and a chain-type X-axis driving means 9, and the width of the table assembly is adjusted by moving the tables 6 crosswise so that the width corresponds to the lateral width of the sheet 1 to be placed on the table assembly. The motor 7 is coupled to a pulse-counting rotary encoder 12 which forms a detecting device capable of generating a signal displaying the moving distance of the table assembly. Further, the table assembly has attached to it a photoelectric-type sensor 17 which generates a drive signal for controlling the movement of the table assembly.

At a position midway along the moving passage of the table assembly, there are provided: a pair of sensors 15 arranged above the frame 10 and positioned apart; a sensor 16 located behind one of the sensors 15; two sets of sensor-control mechanisms 14, having pulse motors 13 (not shown) and being arranged on both sides of the frame 10; and, a couple of parallel rods 13a extending between the sensor-control mechanisms 14, to which rods the sensors 15 are mounted respectively so that the sensors 15 with the corresponding rods 13a are moved by the motors 13, respectively. Each of the sensors 15 is of the penetrant type, especially of an eddy-current type capable of detecting the variation of a magnetic force generated in the metallic wire 2 within the sheet 1 when the wire is subjected to the line of magnetic force. Further, the sensors 15 move over the sheet 1 along their respective rods 13a so as to profile the peripheries of the longitudinal sides (viz, the rows of turning ends 2a) of the wire 2 and generate pulsating information signals relating to the positions thereof, respectively. The sensor 16 is adapted so as to detect the top and the rear ends of the sheet 1.

On the downstream side of the moving passage of the table assembly and at a position located a predetermined distance from each of the sensors 15, there is provided a sheet-cutting device comprising a super high-pressure water-jet cutter 32 which is movable in the lateral direction. The cutter 32 includes a bracket 20 provided on a frame 18 and being movable laterally with respect to the sheet 1 through a rack-pinion mechanism or the like, a step motor 19 for driving the water-injecting head of the cutter 32, a water jet-injection nozzle 22 fixed to the bracket 20 so as to face downward, a telescopic passage 21 for feeding a super high-pressure water jet to the nozzle 22 from a super high-pressure water-jet generator 25, a splash prevention wall 23, and a drain pit 24. The step motor 19 is controlled by a motor controller 31 (shown in FIG. 3).

Numeral 26 designates a controlling signal generator means for controlling the super high-pressure water-jet generator 25, and numeral 27 designates a signal processor for the super high-pressure water-jet cutter 32. The signal processor 27 receives a signal from the pulse control section 28 (shown in FIG. 3) which receives a signal from the rotary encoder 12 and a signal from the sensor signal processor 29 (shown in FIG. 3). The signal processor 27 generates a control signal for controlling the lateral movement of the nozzle 22 with respect to the periphery of each of the longitudinal sides (or the rows of turning ends 2a) of the metallic wire 2 in the sheet 1. In this case, the control signal includes therein components regarding such data as the pattern of the metallic wire, the distance between the periphery of each of the longitudinal sides of the wire and each of the cutting lines 2c along which the sheet 1 is cut, and the distance between each of the sensors 15 and the nozzle 22 which have already been combined with the information signal from the rotary encoder 12 and the information signals from the sensors 15.

Figure 3:
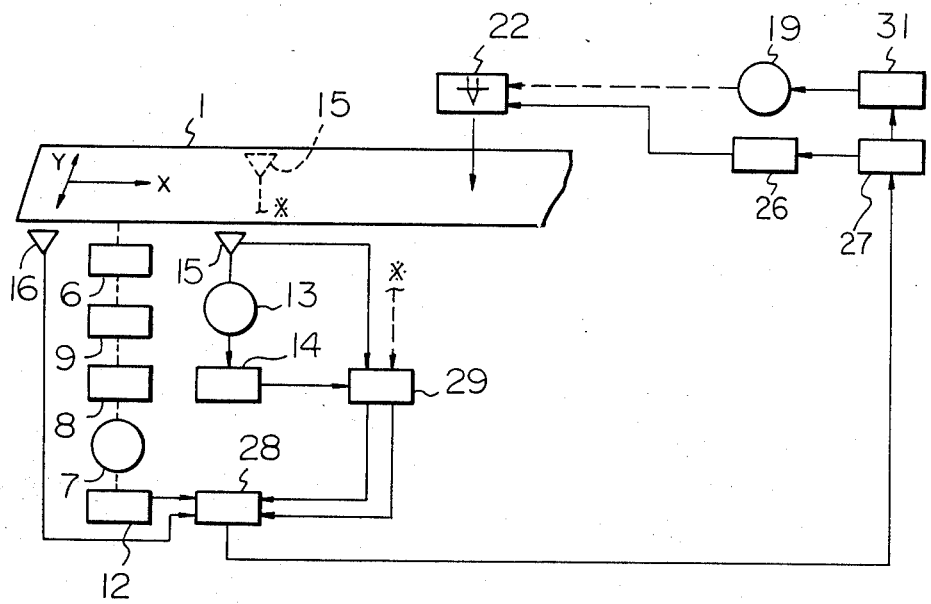
FIG. 3 is a block diagram of a control mechanism of the apparatus shown in FIG. 2.

In the block diagram shown in FIG. 3, the rotary encoder 12 transmits an information signal regarding the longitudinal (viz, X-axis) moving distance of the table assembly to a pulse control section 28 where the signal is combined with the signals from the sensor 15, and the pulse control section 28 transmits a signal to the signal processor 27, which in turn generates a command signal for controlling the movement of the super high-pressure water-jet injection nozzle 22.

Thus, the eddy-current type sensors 15, the sensor-driving pulse motors 13, the sensor control mechanisms 14, the sensor signal processor 29, the rotary encoder 12, and the pulse control section 28 transmit and receive signals as designated by the arrows shown in FIG. 3 so that the movement of the nozzle 22 is controlled. That is, the signal indicative of the position of the periphery of the metal is transmitted to the pulse control section 28, and the signal from the rotary encoder 12 and the signal from the sensor signal processor 29 are combined to form a signal in the pulse control section 28, which signal is transmitted from the section 28 to a signal processor 27 for controlling the jet nozzle 22, as viewed together in FIGS. 2 and 3.

Numeral 19 designates a motor for driving the super high-pressure water-jet cutter 32 numeral 25 and 26 designate the super high-pressure water-jet generator and the controlling generator 25, respectively. Further, numeral 31 designates a motor controller for controlling motor 19. The signal processor 27 at once stores the signal from the signal processor 29 via the pulse control section 28 and tramsmits to the motor controller 31 an information signal regarding the Y-axis movement of the nozzle 22 so that the nozzle 22 moves automatically in the Y-axis direction. The dotted arrow marked with an asterisk designates a signal from the remaining sensor 15. Further, it should be noted in this connection that although the embodiment shown in FIGS. 2 and 3 includes only a single super high-pressure water-jet cutter, it is possible to provide a couple of such cutters and to make them correspond to the two sensors, respectively, so that they are separately controlled.

In a case where the sheet 1 embedded with the metallic wire (copper) 2 shown in FIG. 1 is trimmed successively on one of the longitudinal sides thereof at a position a predetermined distance outwardly from the periphery of the corresponding side of the metallic wire 2, the sheet 1 is held stationary on the table assembly in advance in such a manner that both sides of the sheet 1 project somewhat beyond the corresponding sides of the table assembly, respectively, as shown in FIG. 2 and the sides of the table assembly lie inside the corresponding sides of the metallic wire 2, respectively.

In the above condition, when the motor 7 is operated, the sheet 1 is moved in the longitudinal direction so as to pass under the sensors 15 whereupon the photoelectric-type sensor 16 detects the top and then the rear ends of the sheet 1 and generates respective signals to the pulse control section 28 while at the same time the sensor 15 located on the cutting side of the sheet 1 begins to profile the periphery (or the rows of turning ends 2a) of the corresponding side of the metallic wire 2 and generates an information signal to the pulse control section 28 where the signal is combined with the X-axis table-moving distance signal from the rotary encoder 12 and the combined signal is then converted into a two dimensional signal to be transmitted to the signal processor 27, which in turn generates a signal for controlling the lateral movement of the nozzle 22 with respect to the metallic wire 2 and the sheet 1. The manner in which the signal processor 27 produces the control signal for the nozzle 22 is such that the components of the information signal (from the sensor 15) regarding the positions of the first three turning ends 2a (A, B and C) of the metallic wire 2 are synthesized to thereby produce a first signal component displaying the first part of the line 2c (FIG. 1) parallel to the line connecting the three turning ends (A, B and C) and forming a part of the curved peripheral line 2b of that side of the metallic wire and then like components regarding the position of the fourth turning end (D) and the positions of the adjoining two of the first three turning ends (B and C) behind the former (D) are synthesized to produce a second signal component displaying another part of the line 2c and so on to thereby produce an information signal displaying the entire length of the line 2c along which the movement of the nozzle 22 is controlled as the sheet 1 is being transferred along the Tables 6.

Thus, when the sheet 1 reaches the super high-pressure water-jet nozzle 22 of the cutter 32, the nozzle 22 begins to cut the sheet 1 with a super high-pressure water jet therefrom while it is controlled by the control signal from the signal processor 27 so that the desired side of the sheet 1 is cut automatically and continuously along the line 2c, which is spaced, for example, several millimeters from each of the turning ends 2a of the corresponding side of the metallic wire 2.

It should be noted in this connection that although the embodiment shown in FIG. 2 includes only a single cutter, it is of course possible to provide a couple of such cutters corresponding to the two sensors 15 so that the sheet 1 is cut on both sides simultaneously in a single step. Likewise, the eddy current-type sensors 15 of the embodiment in FIG. 2 can be replaced with other types of penetrant sensors such as a static capacity-type sensor capable of detecting the static capacity of the metal in the sheet, an X-ray-type sensor based on the rate of penetration of X-rays through the sheet, or an X-ray image-type sensor capable of forming an X-ray image through the sheet. Further, the sheet cutter 32 can be replaced with an edge-type cutter, such as a band saw, a laser beam cutter, or a plasma jet cutter.

Figure 4:
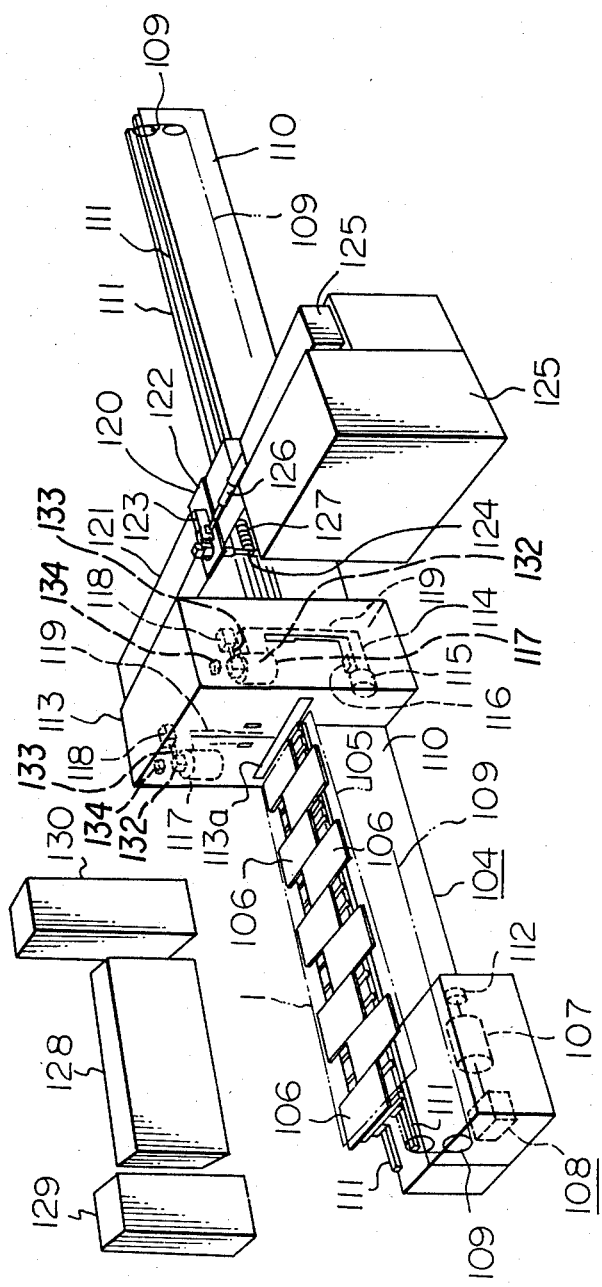
FIG. 4 is a perspective view of another embodiment of the apparatus of the present invention which corresponds to the apparatus shown in FIG. 2.
Figure 5:
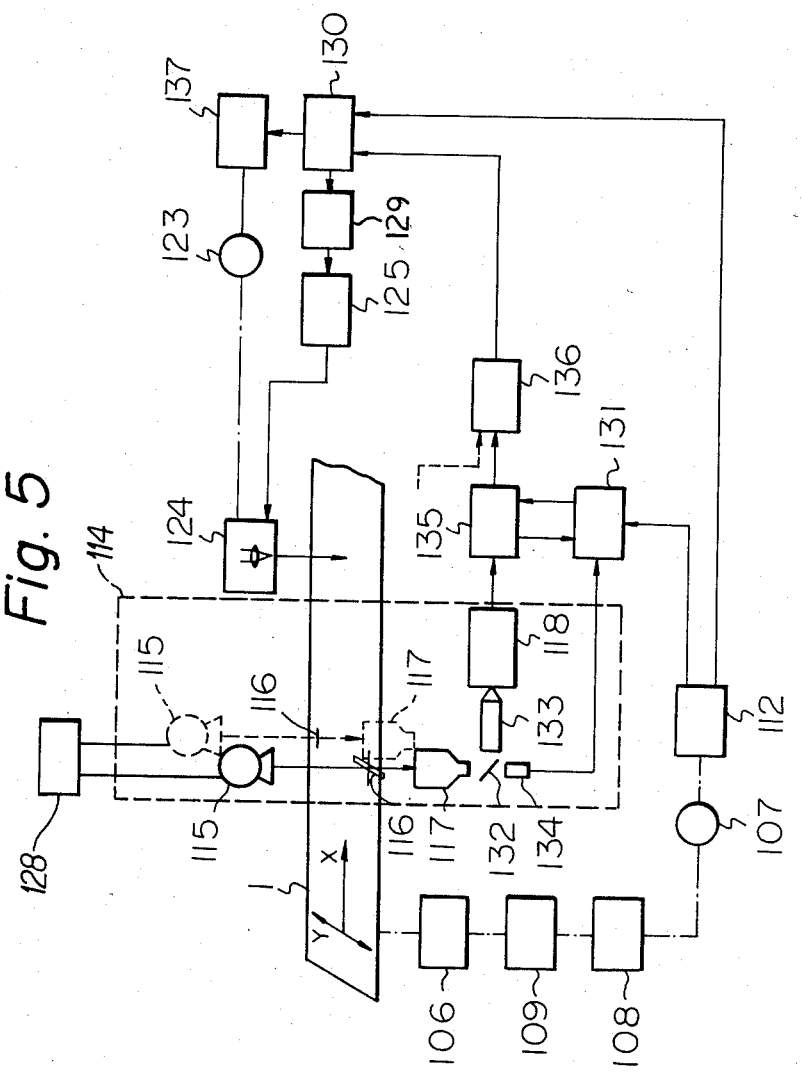
FIG. 5 is a block diagram of a control mechanism of the apparatus shown in FIG. 4 which corresponds to the block diagram shown in FIG. 3.

FIGS. 4 and 5 show another embodiment of the present invention wherein a laser-beam type sheet-cutting device and a couple of X-ray-type sensors are used.

In FIG. 4, numeral 104 designates a transfer device provided with a taple assembly formed from a plurality of tables 106 of equal size and adapted so as to transfer longitudinally a sheet 1 having a high rate of laser beam adsorption and being embedded with a metallic wire having a low rate of laser beam adsorption, the sheet and the metallic wire being the same as those shown in FIG. 1.

The table assembly is movable along guides 111 provided on a frame 110 through a mechanism including a variable speed motor 107, a reducing gear 108, and a chain-type driving means 109. The width of the table assembly is adjusted by moving the table 106 crosswise so that the width corresponds with the width of the sheet 1 to be placed thereon. The motor 107 is coupled to a pluse-counting rotary encoder 112 which forms a detecting device for generating an information signal indicative of the longitudinal moving distance of the table assembly.

At a position midway along the moving passage of the table assembly, there is provided across the frame 110 an X-ray-proof sensor casing 113 which houses a pair of non-contact-type sensors 114. The sensors 114 are adapted so as to profile the peripheries of the longitudinal sides (viz the rows of turning edgs 2a) of the metallic wire 2 in the sheet 1 and generate information signals regarding the positions of the turning ends 2a of the metallic wire 2, respectively. Numeral 113a designates an inlet-outlet port through which the table assembly and the sheet 1 pass. Each of the sensors 114 includes an X-ray tube 115, a slit 116 with a reference mark, an image intensifier 117 arranged just above the slit 116 in opposite relationship with the latter, a half mirror 132 for detecting the sheet 1 on the table assembly, a photo-sensor 134, a lens 133, and a line camera 118 attached to a frame 119 and adapted so as to detect the position of the metallic wire 2 in the sheet 1. The above pair of the X-ray-type sensors 114 are arranged so that they are located apart from each other crosswise at positions at which both of the longitudinal side edges of the metallic wire pass and are movable crosswise manually.

Further, on the downstream side of the moving passage of the table assembly, there is provided a laser-cutting device 120 positioned a predetermined distance from the sensors 114. The laser-cutting device 120 comprises a bracket 122 which is mounted on a frame 121 and which is movable laterally with respect to the sheet 1 through a rack-pinion mechanism or the like, a laser beam head-driving step motor 123 mounted on the bracket 122, a laser head 124 attached to the bracket 122 so as to face downward, a telescopic passage 126 through which a laser beam from a $CO_2$ laser oscillator 125 is fed to the laser head 124, and an exhaust smoke duct 127.

Numeral 128 designates an X-ray control panel, numeral 129 designates a control panel for controlling the positions of the laser oscillator 125 and the laser head 124, and numeral 130 designates a signal processor which generates a command signal for controlling the lateral movement of the laser head 124 of the laser-cutting device 120 after receiving the signal from the detecting device formed from the rotary encoder 112. With the above arangement, the sheet 1 is cut on one side thereof along a line a predetermined distance outwardly from the periphery of the corresponding side or the row of turning ends 2a of the metallic wire 2 in the sheet 1 while the sheet is being transferred.

A pulse control section 131, a camera controller 135 and a second signal processor 136 are shown in FIG. 5 and explained hereinafter.

In the block diagram shown in FIG. 5, the information signal regarding the X-axis moving distance of the table assembly is transmitted from the rotary encoder 112 to a pulse control section 131 where the signal is combined with the information signals from the non-contact-type sensors 114, including the X-ray tube 115, the X-ray penetrant slit 116, the image intensifier 117, the half-mirror 132, a lens 133, the line camera 118 and the photo-sensor 134 as already mentioned hereinbefore. The X-ray tube 115 is controlled through the X-ray control panel 128. The pulse control section 131 transmits a signal to a first signal processor 130 for the laser head 124 via a camera controller 135 and a second signal processor 136. The rotary encoder 112 also transmits its signal directly to the first signal processor 130, which in turn transmits a control signal to the laser head 124 and its control panel 129 of the laser-cutting device 120 via the laser oscillator 125. Further, the signal processor 130 also transmits to a motor controller 137 a control signal for moving the laser head 124 automatically in the lateral (viz, Y-axis) direction through the motor controller 137. The dotted arrow adjacent to the second signal processor 136 designates a signal from the remaining sensor 114. Further, it should be noted that although the embodiment shown in FIGS. 4 and 5 includes only a single laser-cutting device, it is possible to provide a couple of such devices and to make correspond to the two sensors 114, respectively, so that they are separately controlled.

In a case where the sheet 1 embedded with the metallic (copper) wire 2 shown in FIG. 1 is trimmed successively on one of the longitudinal sides thereof at a position a predetermined distance outwardly from the peripery of the corresponding side of the metallic wire 2, the sheet 1 is held stationarily on the table assembly in such a manner that both sides of the sheet 1 project somewhat beyond the corresponding sides of the table assembly, respectively, as shown in FIG. 4 and the sides of the table assembly lie inside the corresponding sides (or the rows of turning ends 2a) of the metallic wire 2, respectively.

In the above condition, when the motor 107 is operated, the sheet 1 is transferred in the longitudinal direction and passes under the two sensors 114 whereupon one of the sensors 114 located on the cutting side of the sheet 1 begins to profile the periphery of the side of the sheet 1 to be cut through its photo-sensor 134 and transmits an information signal relating thereto to the pulse control section 131 where the signal is combined with the table moving-distance signal from the rotary encoder 112. Further, the sensor 114 also detects the number of turning ends 2a of the corresponding side of the metallic wire 2 with its line camera 118 and generates a signal indicating the distance between each of the turning ends of the wire and the reference mark on the slit 116 of the sensor. This signal is transmitted through the camera controller 135 to the pulse control section 131 where it is combined with the above-mentioned table moving-distance information signal from the rotary encoder 112. Thus, the combined two-dimensional information signal is transmitted to the signal processor 136 where the signal is converted into a signal suitable for transmission to the signal processor 130 for the laser-cutting device 120 and, finally, the signal processor 130 combines the signal from the signal processor 136 with data regarding the distance between the sensor 114 and the laser head 124 and the distance between each of the turning ends 2a of the metallic wire 2 and the cutting line 2c along which the side of the sheet is cut and produces a new signal in the same three turning ends pick-up system as described with respect to the embodiment shown in FIG. 2.

Thus, when the top end of the sheet 1 reaches the laser-cutting device 120, the laser head 124 begins to cut the sheet 1 with a laser beam therefrom while the lateral movement of the laser head is controlled by the control signal from the signal processor 130 so that the sheet 1 is cut successively on one of the logitudinal sides thereof at a position a predetermined distance, for example, on the order of several millimeters, outwardly from the periphery of the corresponding side (or the row of turning ends 2a) of the metallic wire 2. The above-described cutting process also is applied in cutting the remaining side of the sheet 1. In this connection, it is of course possible to cut the sheet on both longitudinal sides thereof simultaneously provided that the laser-cutting device 120 is equipped with an additional laser head.

As described above, the present invention has the following various advantages:

(1) an elongated sheet having a metal embedded therein or attached thereon virtually throughout the length thereof can be trimmed by cutting the sheet accurately and at a predetermined dimension continuously and automatically on each side thereof at a position a predetermined distance outwardly from the corresponding side of the metal without cutting the metal even when the sheet is opaque;

(2) a polyethylene cover sheet having a copper wire embedded in its thermo-shrinkable layer can be cut accurately on each of the longitudinal sides thereof at a position a predetermined distance outwardly from the corresponding side of the copper wire so that the sheet thus trimmed can be effectively applied to a weld joint for steel pipes in a water-tight manner, thereby preventing the joint from corroding;

(3) due to the use of a laser-cutting device, a sheet comprising a synthetic resin plate having an aluminum plate applied thereon can be trimmed by cutting only the synthetic resin plate at a position a predetermined distance inwardly from any side of the aluminum plate, taking advantage of the fact that the synthetic resin plate has a high rate of laser beam absorption while the aluminum plate has a low rate of laser beam absorption;

(4) due to the provision of a super high-pressure water-jet cutter or a laser beam cutter, a thermo-shrinkable sheet can be cut without shrinkage and a curved cutting line can be traced easily so that even a continuous curved surface can be cut easily and accurately;

(5) many kinds and qualities of sheets or a composite sheet produced by using an adhesive can be cut clearly with only a small amount of cutting chips resulting and the chips can be removed easily.

We claim:

1. A method of trimming an elongated nonmetallic sheet having a metal portion in intimate contact therewith over the entire length thereof, comprising the steps of:

applying a cutting device for cutting the sheet, said cutting device being stationary in the longitudinal direction of the sheet;

transferring the sheet in the longitudinal direction along a predetermined straight transfer passage;

profiling the periphery of each of the longitudinal sides of the metal portion gradually while the sheet is being transferred along said transfer passage and obtaining a first information signal indicative of a position a predetermined lateral distance from the periphery of the profile, said metal portion being a wire arranged in a reversing path and having turning ends on each longitudinal side of said sheet, said first information signal being obtained by detecting the positions of at least three consecutive turning ends on at least one side of said sheet, generating a profile signal indicative of the positions of each of said turning ends, synthesizing the three signals to produce a signal component representing a part of a line parallel to said periphery of the profile and a predetermined distance outwardly from the periphery of the profile, generating a profile signal of a fourth turning end and synthesizing the signals indicative of the position of the fourth turning end and the positions of the two previous turning ends to produce a signal component representing a subsequent part of said line; and detecting the longitudinal moving distance of the sheet and obtaining a second information signal indicative of the distance of movement of the sheet; and controlling the lateral movement of said cutting device in response to said first and second information signals so that the sheet is cut continuously on each of the longitudinal sides of the sheet along a line parallel to and a predetermined distance from the periphery of the outline of the corresponding turning ends of the metal.

2. An apparatus for trimming an elongated nonmetallic sheet having a metal in intimate contact therewith, comprising:

a transfer device including an assembly of a plurality of support means for carrying the sheet in the longitudinal direction along a moving passage of said transfer device;

a pair of X-ray type penetrant sensors arranged midway in the moving passage of said transfer device, each of said sensors being capable of profiling the periphery of each of the longitudinal sides of the metal and of generating an information signal indicative of the position of the periphery;

a laser-cutting device arranged adjacent to said sensors and being capable of moving in the lateral direction with respect to the metal and the sheet;

a detecting device for detecting the distance of movement of said transfer device and generating an information signal indicative to the movement of said transfer device; and a signal-processing system including a first signal processor for said sensors, a pulse control section for said detecting device, and a second signal processor for controlling the lateral movement of said cutting device with respect to the metal and the sheet;

whereby the sheet is cut automatically and continuously on each of the longitudinal sides thereof along a line a predetermined lateral distance outwardly or inwardly from the periphery of the corresponding side of the metal.

3. An apparatus for trimming an elongated nonmetallic sheet having a metal in intimate contact therewith, comprising:

a transfer device including an assembly of a plurality of support means for carrying the sheet in the longitudinal direction along a moving passage of said transfer device;

a pair of eddy-current type penetrant sensors arranged midway in the moving passage of said transfer device, each of said sensors being capable of profiling the periphery of each of the longitudinal sides of the metal and of generating an information signal indicative of the position of the periphery;

a super high-pressure water-jet cutting device arranged adjacent to said sensors and being capable of moving in the lateral direction with respect to the metal and the sheet;

a detecting device for detecting distance of movement of said transfer device and for generating an information signal indicative of the moving distance of said transfer device; and a signal-processing system including a first signal processor for said sensors, a pulse control section for said detecting device, and a second signal processor for controlling the lateral movement of said cutting device with respect to the metal and the sheet;

whereby the sheet is cut automatically and continuously on each of the longitudinal sides thereof along a line a predetermined lateral distance outwardly or inwardly from the periphery of the corresponding side of the metal.

* * * * *